United States Patent [19]
Kalkanoglu et al.

[11] Patent Number: 5,961,780
[45] Date of Patent: Oct. 5, 1999

[54] APPARATUS FOR MAKING A SHINGLE

[75] Inventors: Husnu M. Kalkanoglu, Swathmore; Joseph Quaranta, Yardley; Kermit E. Stahl, North Wales, all of Pa.

[73] Assignee: CertainTeed Corporation, Del.

[21] Appl. No.: 09/018,480

[22] Filed: Feb. 4, 1998

[51] Int. Cl.⁶ .............................. E04D 1/28; B32B 31/18
[52] U.S. Cl. ..................... 156/517; 156/549; 156/555; 52/559; 52/555; 427/187; 83/920
[58] Field of Search ..................... 156/251, 257, 156/269, 515, 518, 519, 517, 549, 555, 578; 52/555, 559; 427/187; 83/346, 347, 920

[56] References Cited

U.S. PATENT DOCUMENTS

| | | | |
|---|---|---|---|
| 2,118,632 | 5/1938 | Wettlaufer | 52/559 |
| 2,171,010 | 8/1939 | Schuetz et al. | 52/555 |
| 4,352,837 | 10/1982 | Kopenhaver | |
| 5,181,361 | 1/1993 | Hannah et al. | |

*Primary Examiner*—Michael W. Ball
*Assistant Examiner*—Michael A Tolin
*Attorney, Agent, or Firm*—Paul & Paul

[57] ABSTRACT

Apparatus is provided for making a multi-layer shingle by cutting an anterior layer of shingle material to have a headlap area and a tab area, and with a plurality of tabs being present in the tab area, separated by slotted openings. The tab area of the anterior shingle layer has a predetermined design that has a repeatability in the longitudinal direction, or from one edge of a shingle to another in the right-to-left direction, which repeatability is a function of the length of the shingle between said left and right edges, as well as being a function of the number of tabs in the anterior shingle layer, with the repeatability being smaller or greater than the length of the shingle in the longitudinal direction. Thereby, the apparatus produces an ornamental appearance that has a random, natural-looking effect when the shingles are laid up on a roof.

7 Claims, 4 Drawing Sheets

APPARATUS FOR MAKING A SHINGLE

BACKGROUND OF THE INVENTION

In the art of making shingles, it is known to make multi-tab shingles, with the tabs in a tab area at a lower end of a shingle and having a headlap area above the tab area. The individual tabs are separated by slots cut into the tab area from a lower edge of the shingle. It is also known that shingles can be constructed to be of the multi-tab type, comprising, three, four, or five or more tabs per shingle.

It is also known in the shingle art that it is desirable to make shingles that give the appearance, when installed on a roof, of natural materials, such as wooden cedar shakes, slate, etc. To this end, sometimes the lower edges of the tabs are irregularly shaped, and in some cases the tabs may have variations in vertical length, so that the lower edges of the tabs are not always necessarily in line.

In the manufacture of shingles, it is further known to manufacture shingles from what is originally an endless or substantially endless sheet of shingle material, generally comprising a mat which may be constructed of either organic or inorganic material, and often of a fiberglass material, with the mat then being impregnated and coated with asphalt or other bituminous material, to which granules are applied. Such a layer of shingle material is then cut to form individual shingles of a desired length and width. One way of cutting the shingle material into individual shingles, is to run the shingle material between one or more pairs of cutting rollers. For example, if single layer shingles are manufactured, the pair of cutting rollers may comprise a cutting roll and a back-up or anvil roll, whereby, as the shingle material is conveyed therebetween, cutting blades carried on the cutting roller press through the shingle material, pressing the same against a die roller, such that longitudinal cuts, including spaced apart tab-forming slots are cut into the shingle material and lower edges of the tabs and the upper edge of the headlap area are likewise cut.

Generally, the same cutting roll that is described above is also furnished with one or more cutting blades that will make the transverse cuts necessary to sever the shingle material transversely to preselected lengths, after which the individual shingles may then be stacked for shipment.

In the manufacture of multi-layer (also called laminated) shingles the first pair of cutting rolls may lack the cutting blades that are responsible for severing the shingle material transversely to preselected lengths. Rather, the cutting blades on the first cutting roll may be used as a "pattern cutter", cutting a repeating pattern in an endless, or substantially endless manner. Other layer(s) comprising the multi-layer shingle would generally also be cut by the first cutting roll. Following this cutting action the layers comprising the multi-layer shingle would generally be positioned underneath one another, and laminated to one another with generally asphalt based adhesive. Generally, thereafter, the laminated layers may be severed into preselected shingle lengths in any suitable manner, such as by running the shingle material between another pair of rolls which are furnished with one or more cutting blades that make the transverse cuts necessary to sever the shingle material transversely to preselected lengths, after which the individual shingles may then be stacked for shipment.

THE PRESENT INVENTION

The present invention is directed toward manufacturing single layer shingles or multi-layer shingles (laminated shingles), to introduce a seemingly random appearance to the shingles, whereby, as they are laid up on a roof, different shingles with, perhaps variations in designs of the tabs will not be, nor appear to be, identical from shingle-to-shingle. Thus, a roof constructed of such shingles will have an increased random-appearing, natural looking effect.

This effect is achieved by making the longitudinal cut and tab or slot-forming cut by means of a cutting roller having a cut repeatability that is different than the length of the shingle; specifically one in which the repeatability, while being predetermined, is greater or smaller than the length of a shingle by a predetermined amount.

SUMMARY OF THE INVENTION

The present invention is therefore directed to providing an apparatus for cutting a pattern in a shingle layer to yield a shingle having a natural, random appearance, in which cutting the pattern into the shingle layer in the longitudinal direction is a function of the length of the shingle, but is different than the length of the shingle.

Accordingly, it is a primary object of this invention to accomplish that set forth in the Summary of the Invention.

It is another object of this invention to accomplish the object above, wherein the circumference of the cutting roll is also a function of the number of tabs in the shingle.

It is a further object of this invention to accomplish the above objects, in which the cutting roll is effective for cutting a shingle layer so that tabs at the ends of the shingle are cut substantially midway through shingle tabs, rather than being cut through or close to slots that separate tabs of the shingle material.

It is a further object of this invention to accomplish the above objects, wherein the apparatus may be used to provide a laminated shingle, wherein at least one of the shingle layers that are laminated together is comprised in accordance with one or more of the objects set forth above.

Other objects and advantages of the present invention may be readily understood, from a reading of the following brief descriptions of the drawing figures, the detailed descriptions of the preferred embodiments, and the appended claims.

BRIEF DESCRIPTION OF THE DRAWING FIGURES

Figure 4:
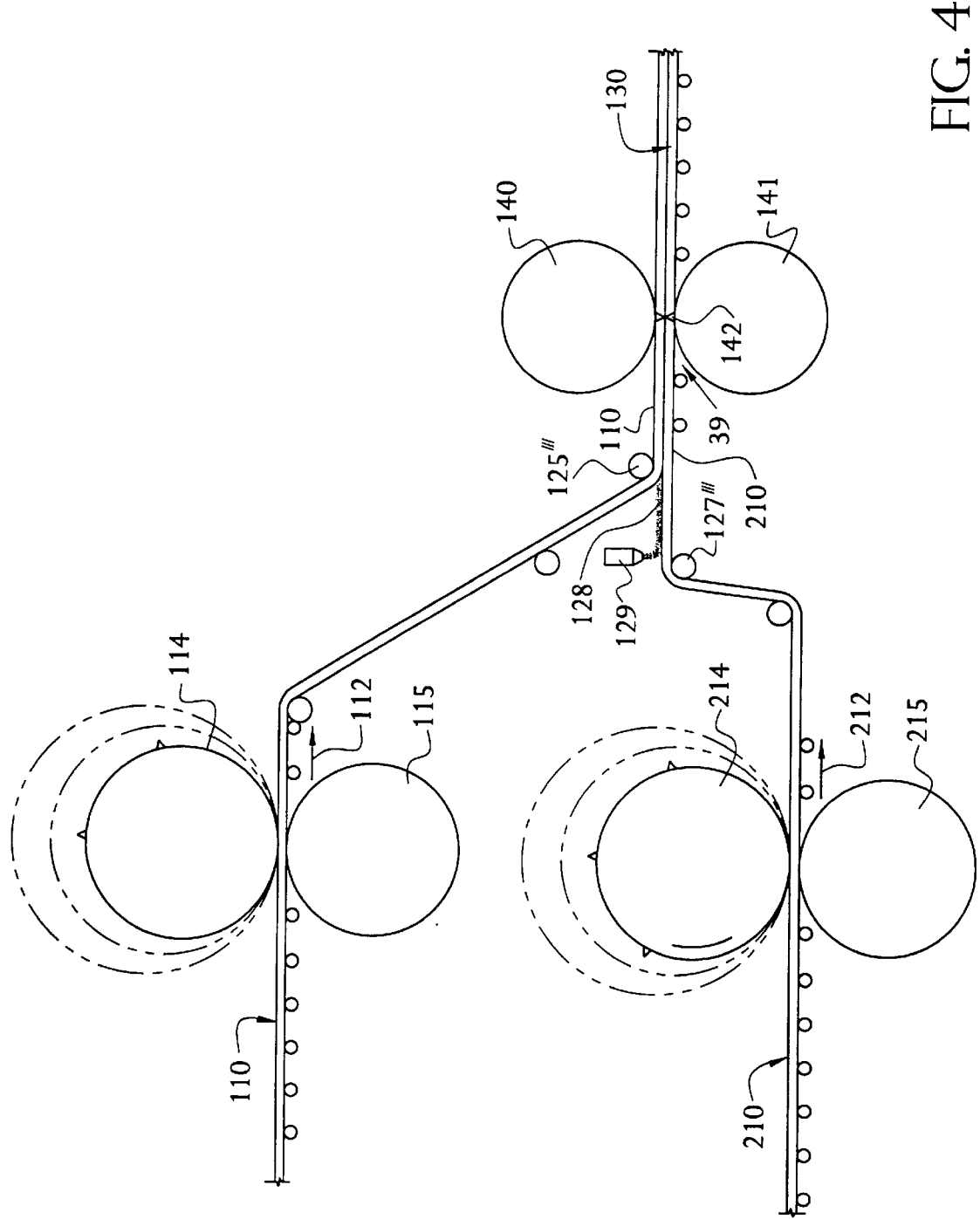

FIG. 4. is a side elevational view of an alternative apparatus for making a shingle in accordance with this invention.

DETAILED DESCRIPTIONS OF THE PREFERRED EMBODIMENTS

Figure 1:
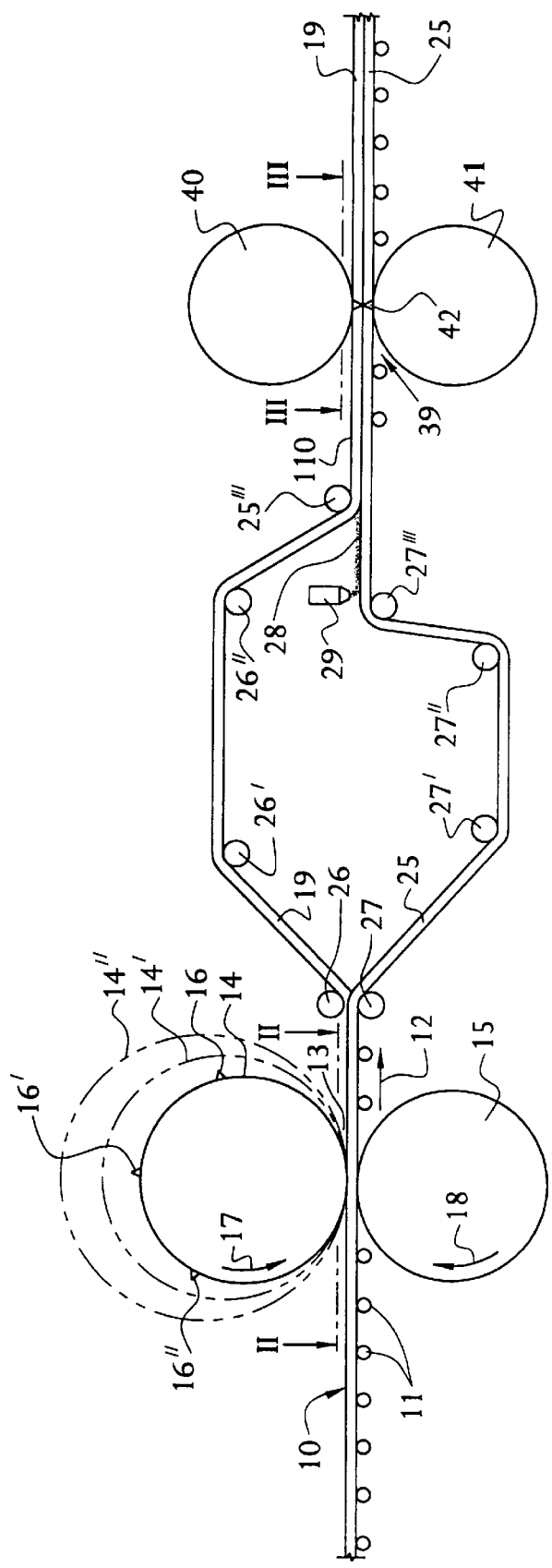
FIG. 1 is a side elevational view of an apparatus for making a shingle in accordance with this invention.

Referring now to the drawings in detail, reference is first made to FIG. 1, wherein there is illustrated a sheet of shingle material 10, in accordance with this invention. The shingle material 10 generally comprises an organic or inorganic mat that has been immersed in, so as to become coated by, an asphalt or other preferably bituminous material, which then has a plurality of granules applied to a surface thereof. The granules are generally applied to the upper surface as viewed in FIG. 1, by means not shown. A talc, or small particles may be applied to a lower surface thereof, as well. The shingle material is made from a rolled mat or the like, and may have granules applied thereto, for example, in accordance with the teachings of U.S. Pat. No. 4,352,837, the complete disclosure of which is herein incorporated by reference, or in any other suitable manner.

Figure 2:
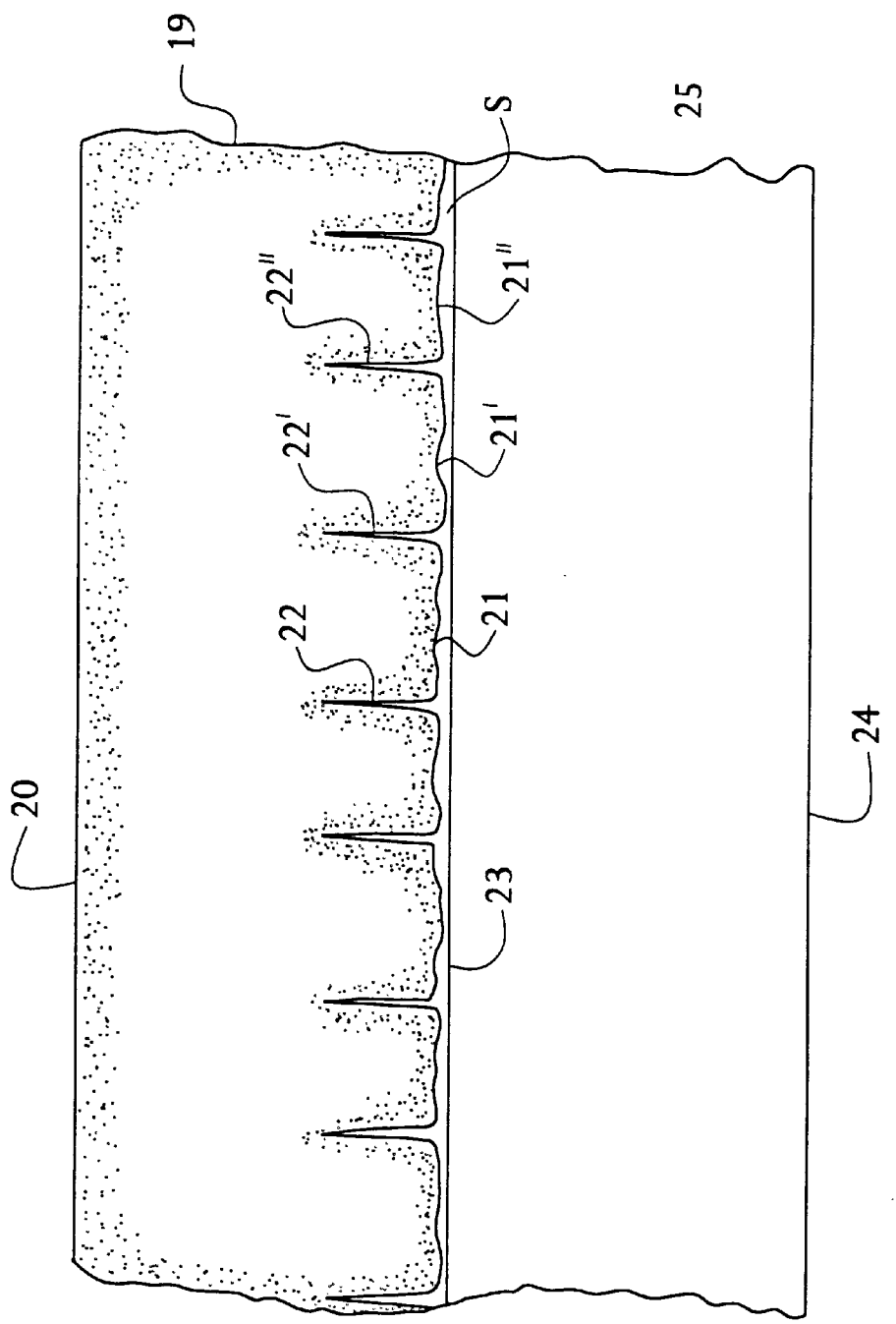
FIG. 2 is a plan view of a sheet of shingle material, showing the shingle layers that will comprise the anterior and posterior layers of the shingle cut therefrom, with the view of FIG. 2 being taken generally along the line II—II of FIG. 1.

The shingle material 10 is then conveyed along the rollers 11 of a conveyor in the longitudinal direction of the arrow 12, as shown in FIG. 1, to pass through the nip 13 between a cutting mechanism comprised of a cutting roller 14 and a back-up or die or anvil roller 15. Of course, the position of these rollers is interchangeable. For example, anvil roller 15 could be on top of cutting roller 14. The cutting roll or roller 14 will generally have a plurality of cutting blades 16 thereon, such that when the sheet 10 is passed therebetween, with the upper and lower rolls or rollers 14,15 being rotated in directions illustrated by the arrows 17,18, respectively, such will allow the blades 16 to cut through the shingle material 10, effecting tab lower edge cuts 21, 21', 21", etc., as well as cutting the slots 22, 22', 22", etc., as shown in FIG. 2, as well as the remaining slots and lower tab edges not specifically numbered, all in and defining the shape, except for the longitudinal edges of the continuous layer 19 that will comprise the anterior layer of a laminated shingle in accordance with this invention.

The continuous layer 25 that will comprise the posterior layer of the laminated shingle is likewise defined by the cut edge 23 and the uncut edge 24.

The upper continuous layer 19 is delivered to the nip 39 between severing rollers 40 and 41, via spacing rollers 26, 26', 26" and 26'". The lower continuous layer 25 is delivered to the nip 39 between severing rollers 40 and 41 via spacing rollers 27, 27', 27" and 27'", as shown in FIG. 1, with one or both of the layers 19,25 being moved transversely (not shown) such that layer 19 is superimposed over layer 25 to appear as shown in phantom in FIG. 3.

An asphalt or other adhesive 28 is applied via applicator 29, for adhering or laminating the continuous layers 19,25 together as they are brought together beneath roller 26'", as shown.

Figure 3:
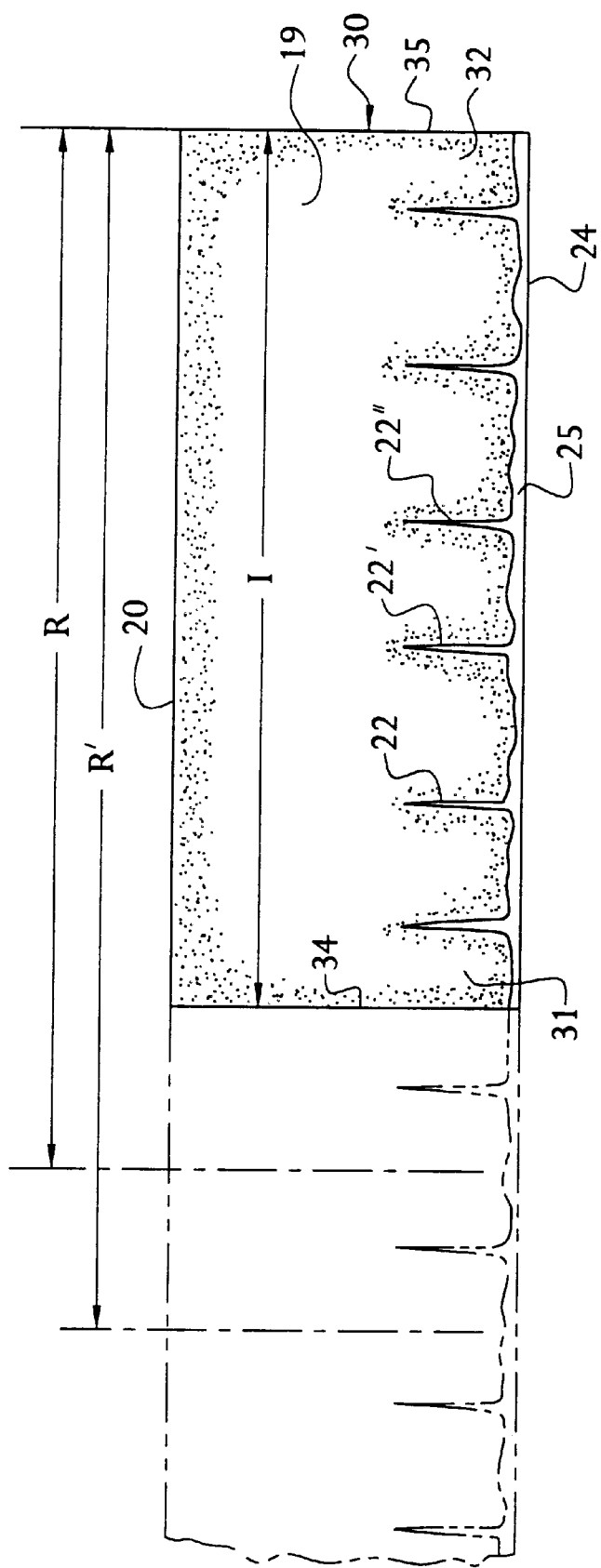
FIG. 3 is a plan view of a multi-layer shingle in full lines, longitudinally cut from a continuous sheet of a multi-layer shingle material shown in phantom, along line III—III of FIG. 1.

In order to produce the random-appearing cut shown in FIG. 3, the roll 14 is constructed that its circumference C is defined by the formula $$C = \frac{L(x+n)}{x};$$

and where x=the number of full tabs in the shingle to be cut and wherein any two partial tabs at ends of the shingle to be cut count together as a full tab, as shown in FIG. 3; and where n=a whole number no smaller than −50, no greater than 50 and not equal to zero.

Even more preferably, x=a number selected from the group consisting of 3, 4, 5 and 6 and n is no greater than 10.

By coordinating the circumference C of the roll 14 in such a manner, and where L is the length of a shingle that is to be cut (such as, for example, 36") and shown in FIG. 3, the repeatability R of a given design that is laid out on the roll 14, so that the various blades 16, 16' and 16", etc. can cut out for layer 19 the shingle tabs, the bottom edges of tabs, and the headlap edge, will be a function of the shingle length, and will be defined in shingles by the formula:

$$R = \frac{L(x+n)}{x};$$

where L=the length of the shingle measured longitudinally; and x=the number of full tabs in the shingle and wherein the two tab portions at ends of the shingle count as a full tab; and where n=a whole number no smaller than −50, and no greater than 50 and not equal to zero.

Even more preferably, x will equal a number selected from the group consisting of 3, 4, 5 and 6, and n will be no greater than 10.

For example, with reference to FIG. 3 it will be seen that the shingle is of a length L, such as 36", having five tabs in total, measured by the distance L, and comprising four intermediate tabs, and two partial tabs, with one partial tab at each end of the shingle, which together, amount to a shingle five tabs in length. The repeatability of the design in the shingle 30 of FIG. 3 is represented, for example, by R, R', etc. In the case of the repeatability represented by R, in the shingle represented by the full lines of FIG. 3, where x equals 5 (the entire number of tabs counting the partial tabs 31 and 32 at the ends of the shingle as a full tab in the aggregate), then x equals 5. If n is 1, and the length L is 36", than the repeatability $$R = \frac{36(5+1)}{5}$$

According to such a formula, the repeatability R=43.2 inches. If the roll 14 has a circumference C of 43.2 inches, therefore, the repeatability R will be as set forth above.

If the repeatability R' is, however, as shown in phantom in FIG. 3, then, for a 36" length L of shingle, the repeatability for a shingle comprising 4 full tabs and a partial tab at each end of the shingle, would be:

$$R = \frac{36(5+2)}{5}$$

The repeatability R in such an arrangement would therefore be 50.4 inches, which would be the circumference C of the roll 14' shown in phantom in FIG. 1. Similarly, other applications of the formula above would result in rolls 14", having larger circumferences, to produce comparable repeatabilities, as will be understood by application of such formulae.

It will be noted that it is preferable that the severance lines for the tab portions at each end of the shingle 30 be approximately halfway through each tab, as shown, although some variation is allowed from severing ends of the shingle precisely halfway through tabs, in that such severing of the shingle material into individual shingles introduces some forgiveness in the manufacturing process to allow for slight variations. However, most preferably, the shingles are severed as close as possible to approximately halfway through tabs, to avoid the formation of very small slivers that might otherwise comprise the tab portions, as for example, when the shingles are severed from the shingle material very close to slots that separate the tabs.

Also, with reference to FIG. 1, it will be seen that the severing roll or roller 40 opposes a die roll or roller 41, with the roll 40 having a severing blade 42 thereon, for severing the shingle material 10 into shingles 30, by making transverse cuts that establish the severance lines 34,35 as shown in FIG. 3 that define the left and right ends of the laminated shingle 30 (comprising portion of layers 19 and 25), as viewed in FIG. 3. In this regard, the circumference of the roll 40 corresponds with the length L of the shingle 30, wherein a single blade 42 will effect both transverse cuts that define the opposite ends 34,35 of the shingle 30. It will be understood that other variations may be used in mounting severance blades 42 on a roll 40, such as, having two severance blades 42 mounted on a roll of twice the circumference of roll 40 (not shown) and the same result would be obtained.

With reference now to FIG. 4, it will be seen that other sheets of shingle material 110,210 are disposed to be conveyed in the directions 112,212 shown, between cutting and backup rolls 114,115, and 214,215, whereby upper and lower individual layers of longitudinally cut shingle material 110,210 are delivered to come together as shown between rollers 126''',127''', and wherein an adhesive of bitumen, asphalt, or any other type of adhesive 128 is applied by a suitable adhesive applicator 129, to adhesively secure upper and lower layers 110 and 210 of shingle material together as shown at the right end of FIG. 4, into a single laminated shingle material. This material is then delivered between severing and backup rolls 140,141, respectively, to be cut transversely by blade 142, into individual laminated shingles 130.

In the embodiment of FIG. 4, similar components to those shown in FIG. 1 are functionally and structurally similar, and a detailed description therefore will not be duplicated here.

It will be apparent from the foregoing that other mechanisms for severing the shingles transversely may be provided, other than severing rolls. For example, vertically sildeable severing blades could be used as distinguished from severing rolls. Moreover, the cutting of the lower shingle layer need not be as shown in FIGS. 1 and 4, especially where the lower shingle layer that is to be laminated need not have elaborate slots, lower tab edge configurations, etc. Accordingly, the manner in which the cutting of the lower shingle layer is done is shown in FIGS. 1 and 4 to be representative only.

It will also be apparent that alternatively, the shim stock shown as 25 in FIG. 2, could, if desired, be used to simultaneously have cut therefrom another shingle similar to, or perhaps even a mirror image of the shingle 19, simultaneously with the cutting and severing of the shingle 19, as may be desired.

It will be understood that a major advantage of the present invention is that it creates a slate, cedar shake or other natural look for a roof made from shingles, without limiting the design to tabs having identical widths. Furthermore, the possibility of creating small slivers between a severance cut and a slot opening is eliminated. Also, shingles made in accordance with this invention need not be as tightly controlled as those made where the lines of severance have to perfectly match the center points of the slots 22, 22', 22", etc., such that the present invention results in wider (larger) manufacturing tolerances, and can result in producing less scrap material S. Also, the slots 22, 22', 22", etc. are irregularly configured with non-uniform, non-symmetrical thickness in a given slot and from slot-to-slot, as shown. The bottom edges 21, 21', 21", etc. are likewise randomly configured, as shown. A further advantage of the present invention resides in that the person installing the shingles on a roof need not be concerned with trying to lay down the shingles in accordance with an effort to match slots in the various courses of shingles that are laid on a roof, to be in a perfectly vertical line, because the slots, for example, as shown in FIG. 2, are not all at the same spacing apart from each other. Consequently, some randomness in the location of the slots 22, 22', 22", from course-to-course as shingles are applied onto a roof, is entirely acceptable.

It is apparent from the above that various modifications may be made in the details of construction, as well as in the use and operation of the present invention, all within the spirit and scope of the invention as defined in the appended claims.

We claim:

1. Apparatus for cutting a multi-layer shingle comprised of an anterior layer and a posterior layer, to have a natural, random appearance comprising:

conveyor means for delivering an anterior sheet of shingle material along a predetermined longitudinal path, past a first cutting roll;

a first cutting roll for cutting the shingle material longitudinally as the sheet of shingle material is delivered therepast;

said first cutting roll having cutting means thereon for cutting the anterior shingle material into an upper headlap area and a lower tab area, with the tab area comprising a plurality x of tabs separated by longitudinally spaced apart slotted openings;

means providing a posterior shingle layer;

severing means for severing both anterior and posterior layers of the shingle transversely to predetermined spaced apart lengths L, measured longitudinally;

and wherein said first cutting roll has a predetermined cutting design thereon for the tab area of the shingle with the circumference C of said first cutting roll being defined by the formula:

$$C = \frac{L(x+n)}{x};$$

and where x the number of full tabs in the anterior shingle layer to be cut and wherein any two partial tabs at ends of the anterior shingle layer to be cut count together as a full tab; and where n=a whole number no smaller than −50, no greater than 50 and not equal to zero, whereby the tab area cut design repeatability for the anterior shingle layer in the longitudinal direction, of shingles made on the apparatus, is different than the length of the shingle in the longitudinal direction, enabling a seemingly random appearance to shingles when laid-up on a roof.

2. The apparatus of claim 1 wherein x equals a number selected from the group consisting of 3, 4, 5 and 6 and n is no greater than 10.

3. The apparatus of claim 1, wherein said first cutting roll comprises a predetermined cutting design thereon for the tab area comprising means whereby at least some of the tabs are of different lengths as measured longitudinally, for providing a predetermined random appearance to the tabs of the anterior shingle layer.

4. The apparatus of claim 1, wherein said first cutting roll comprises a predetermined cutting design thereon for the tab area comprising means whereby the tabs are each of the same length as measured longitudinally.

5. The apparatus of claim 1, wherein said first cutting roll comprises a predetermined cutting design thereon for the tab area comprising means whereby there are partial tabs at each end of the anterior shingle layer that, in the aggregate, as measured longitudinally, form a full tab.

6. The apparatus of claim 5, wherein the predetermined cutting design includes means whereby partial tabs at each end of the anterior shingle layer, as measured along a lower edge thereof, are approximately half the length of a tab.

7. The apparatus of any one of claims 1–6, including means for bringing the anterior and posterior layers of shingle material together and applying adhesive therebetween to laminate said layers together as a multi-layer shingle.

\* \* \* \* \*

UNITED STATES PATENT AND TRADEMARK OFFICE
CERTIFICATE OF CORRECTION

PATENT NO. : 5,961,780
DATED : October 5, 1999
INVENTOR(S) : Husnu M. Kalkanoglu, Joseph Quaranta and Kermit E. Stahl Atty. Doc. 169-97

It is certified that error appears in the above-identified patent and that said Letters Patent is hereby corrected as shown below:

Col. 6, line 42 after "x" insert -- = --.

Signed and Sealed this

Thirteenth Day of June, 2000

*Attest:*

Q. TODD DICKINSON

*Attesting Officer*     *Director of Patents and Trademarks*